US010436395B2

(12) United States Patent
Chin

(10) Patent No.: US 10,436,395 B2
(45) Date of Patent: *Oct. 8, 2019

(54) FLEXIBLE ILLUMINATING FLAT CABLE STRUCTURE

(71) Applicant: SUN WELL ELECTRONICS CO., LTD., Dongguan, Guangdong (CN)

(72) Inventor: Hsu-Shen Chin, New Taipei (TW)

(73) Assignee: SUN WELL ELECTRONICS CO., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,037

(22) Filed: Dec. 21, 2018

(65) Prior Publication Data

US 2019/0120446 A1 Apr. 25, 2019

Related U.S. Application Data

(63) Continuation of application No. 16/103,084, filed on Aug. 14, 2018, now Pat. No. 10,197,232, which is a
(Continued)

(30) Foreign Application Priority Data

Feb. 22, 2017 (TW) .............................. 106202592 A

(51) Int. Cl.
*H01R 3/00* (2006.01)
*F21S 4/24* (2016.01)
(Continued)

(52) U.S. Cl.
CPC .............. *F21S 4/24* (2016.01); *G02B 6/0005* (2013.01); *G02B 6/0008* (2013.01);
(Continued)

(58) Field of Classification Search
CPC ................................. F21S 4/24; G02B 6/0005
See application file for complete search history.

(56) References Cited

U.S. PATENT DOCUMENTS 8,333,608 B2   12/2012  Ko
8,641,445 B2   2/2014   Su et al.
(Continued)

FOREIGN PATENT DOCUMENTS

TW          M545379 U       7/2017

*Primary Examiner* — Xuong M Chung Trans
(74) *Attorney, Agent, or Firm* — Hauptman Ham, LLP

(57) ABSTRACT

The present disclosure provides a flexible illuminating flat cable structure including a connector, a circuit board, a plurality of external signal lines, a first illuminating unit, a shell, signal lines, a fiber cable, and a transparent coat. The connector connects to an electronic device. The circuit board includes contact welds, signal line welds, a first illuminating unit weld, controller welds, and an external signal line welds. The external signal lines conduct a power signal or a control signal. The controller generates a power control signal according to the power signal or the control signal sent from the external signal lines. The first illuminating unit generates lights according the power control signal. The shell includes an illuminating mark corresponding to the first illuminating unit. The signal lines transmit data signals. The fiber cable transmits lights.

18 Claims, 8 Drawing Sheets

Related U.S. Application Data continuation of application No. 15/667,921, filed on Aug. 3, 2017, now Pat. No. 10,077,876.

(51) Int. Cl.
    *G02B 6/00*         (2006.01)
    *F21V 8/00*         (2006.01)
    *G02B 6/42*         (2006.01)

(52) U.S. Cl.
    CPC ......... *G02B 6/0068* (2013.01); *G02B 6/0083* (2013.01); *G02B 6/428* (2013.01); *G02B 6/4281* (2013.01); *G02B 6/4293* (2013.01)

(56) References Cited

U.S. PATENT DOCUMENTS

| | | |
|---|---|---|
| 9,461,417 B2 | 10/2016 | Zhang |
| 9,484,685 B2 | 11/2016 | Zhou et al. |
| 9,531,137 B2 | 12/2016 | Zhou et al. |
| 9,753,203 B2 | 9/2017 | Bryan et al. |
| 9,859,667 B2 | 1/2018 | Zhang et al. |
| 10,077,876 B2 * | 9/2018 | Chin .................. F21S 4/24 |
| 2018/0238502 A1 | 8/2018 | Chin |
| 2018/0356054 A1 * | 12/2018 | Chin .................. F21S 4/24 |

* cited by examiner

FLEXIBLE ILLUMINATING FLAT CABLE STRUCTURE

CROSS REFERENCE TO RELATED APPLICATIONS

This application is a continuation application of U.S. Ser. No. 16/103,084, filed on Aug. 14, 2018, which claims priorities of U.S. application Ser. No. 15/667,921, filed on Aug. 3, 2017, and Taiwanese Application No. 106202592, filed on Feb. 22, 2017. The entire disclosures of each of the above applications are incorporated herein by reference.

FIELD OF THE INVENTION

This disclosure relates to a flexible illuminating flat cable structure, and more particularly to a flexible illuminating flat cable structure utilizing the SATA standard.

BACKGROUND

The characteristics of the flexible flat cables (FFC) are curved cable so that they are widely utilized in electronic devices. There are connectors disposed on the sides of the flexible flat cables for the purpose of coupling. However, regarding the importance of design appearance, the present flexible flat cables are required not only to transmit a signal, but also have visual effects generated from the combination of optical elements in order to attract consumers.

SUMMARY

The purpose of the present disclosure is to provide a flexible illuminating flat cable which can emit lights during signal transmission.

The present disclosure provides a flexible illuminating flat cable structure which includes a connector, a circuit board, a plurality of external signal lines, a first illuminating unit, a shell, a plurality of signal lines, a fiber cable, and a transparent coat. The connector includes a plurality of contacts and connects to an electronic device. The circuit board includes a plurality of contact welds, a plurality of signal line welds, a first illuminating unit weld, a plurality of controller welds, and a plurality of external signal line welds. The plurality of contact welds couple to the plurality of contacts and the plurality of signal line welds, and the first illuminating unit weld couples to the plurality of corresponding controller welds.

The plurality of external signal lines connect to the plurality of external signal line welds for conducting a power signal and a control signal. The controller connects to the plurality of controller welds for generating a power control signal according to the power signal and the control signal sent from the external signal lines.

The first illuminating unit connects to the first illuminating unit weld and generates lights according the power control signal generated by the controller. The shell surrounds parts of the external signal lines, the first illuminating unit, and the circuit board and includes an illuminating mark corresponding to the first illuminating unit. The plurality of signal lines couple to the plurality of signal line welds of the circuit board for transmitting date signals sent by the electronic device. The fiber cable transmits lights. The transparent coat surrounds the plurality of signal lines and the fiber cable.

According to the embodiments of the present disclosure, the circuit board further includes a second illuminating unit weld. The flexible illuminating flat cable structure further includes a second illuminating unit and an illuminating unit protector. The second illuminating unit connects to the second illuminating unit weld for emitting lights into the fiber cable when receiving the power control signal generated by the controller. The illuminating unit protector unites the fiber cable and the second illuminating unit.

According to the embodiments of the present disclosure, the illuminating unit protector is made from plastic or metal.

According to the embodiments of the present disclosure, the illuminating unit protector includes a first hole and a second hole. The first hole sleeveably attaches to the second illuminating unit. The second hole sleeveably attaches to the fiber cable.

According to the embodiments of the present disclosure, the flexible illuminating flat cable structure further includes a light-guide unit disposed between the first illuminating unit and the shell for guiding the lights emitted from the first illuminating unit.

According to the embodiments of the present disclosure, the light-guide unit is transparent unit in clear, white, yellow, blue, red, or green color.

According to the embodiments of the present disclosure, the flexible illuminating flat cable structure further includes a line protector matching with the shell where the fiber cable, the plurality of signal lines, and the plurality of external signal lines pass through the line protector.

According to the embodiments of the present disclosure, the flexible illuminating flat cable structure further includes an external signal line connector disposed on the side opposite the circuit board of the external signal lines for receiving the power signal and the control signal.

According to the embodiments of the present disclosure, the illuminating mark is a hollow area.

The present disclosure provides another embodiment of flexible illuminating flat cable structure which includes a connector, a circuit board, a plurality of external signal lines, a controller, a plurality of signal lines, a fiber cable, a transparent coat, a second illuminating unit, and an illuminating unit protector. The connector comprises a plurality of contacts and connects to an electronic device. The circuit board comprises a plurality of contact welds, a plurality of signal line welds, a second controller weld, a plurality of controller welds, and a plurality of external signal line welds. The plurality of contact welds couple to the plurality of contacts and the plurality of signal line welds. The second controller weld couples to the plurality of corresponding controller welds. The plurality of external signal lines connect to the plurality of external signal line welds for conducting a power signal and a control signal. The controller connects to the plurality of controller welds for generating a power control signal according to the power signal and the control signal. The plurality of signal lines coupled to the plurality of signal line welds of the circuit board for transmitting the data signal sent by the electronic device. The fiber cable transmits lights. The transparent coat surrounds the plurality of signal lines and the fiber cable. The second illuminating unit connects to the second illuminating unit welds for emitting lights into the fiber cable according to the power control signal. The illuminating unit protector unites the fiber cable and the second illuminating unit.

According to the embodiments of the present disclosure, the circuit board further comprises a first illuminating unit weld. The flexible illuminating flat cable structure further comprises a first illuminating unit and a shell. The first illumination unit connects to the first illuminating unit weld for emitting lights when receiving the power control signal.

The shell surrounds parts of the external signal lines, the first illuminating unit, and the circuit board, and comprises an illuminating mark corresponding to the first illuminating unit.

According to the embodiments of the present disclosure, the first illuminating unit and the second illuminating unit control the color, illumination, flash frequency, and on-off period of the lights according to the power control signal.

According to the embodiments of the present disclosure, the illuminating unit protector is made from plastic or metal.

According to the embodiments of the present disclosure, the illuminating unit protector comprises a first hole and a second hole, where the first hole sleeveably attaches to the second illuminating unit, and the second hole sleeveably attaches to the fiber cable.

According to the embodiments of the present disclosure, the flexible illuminating flat cable structure further comprises a light-guide unit disposed between the first illuminating unit and the shell for guiding the lights emitted from the first illuminating unit.

According to the embodiments of the present disclosure, the light-guide unit is a transparent unit in clear, white, yellow, blue, red, or green color.

According to the embodiments of the present disclosure, the flexible illuminating flat cable structure further comprises a line protector matching with the shell where the fiber cable, the plurality of signal lines, and the plurality of external signal lines pass through the line protector.

According to the embodiments of the present disclosure, the flexible illuminating flat cable structure further comprises an external signal line connector disposed on the side opposite the circuit board of the external signal lines, for receiving the power signal and the control signal.

According to the embodiments of the present disclosure, the illuminating mark is a hollow area.

In contrast to the existing technology, the flexible illuminating flat cable structure of the present disclosure requires not only signal transmission, but also the combination of the first illuminating unit and the second illuminating unit for allowing the lights emitted by the first illuminating unit to pass through the illuminating mark of the shell for the purpose of highlighting the drawing of the illuminating mark, and in the meantime allowing the flexible flat cable to be illuminated by passing the light emitted by the second illuminating unit through the fiber cable. In addition, the flexible illuminating flat cable of the present disclosure can make the lights flash from the flexible illuminating flat cable for users so that the customer's attraction to the products will be increased.

DETAILED DESCRIPTION OF THE PREFERRED EMBODIMENTS

To comprehend the features, methods, intended functions, and objects of the present disclosure, the practical embodiments will be listed, and the figures and the illustration numbers are as follows.

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

Figure 1:
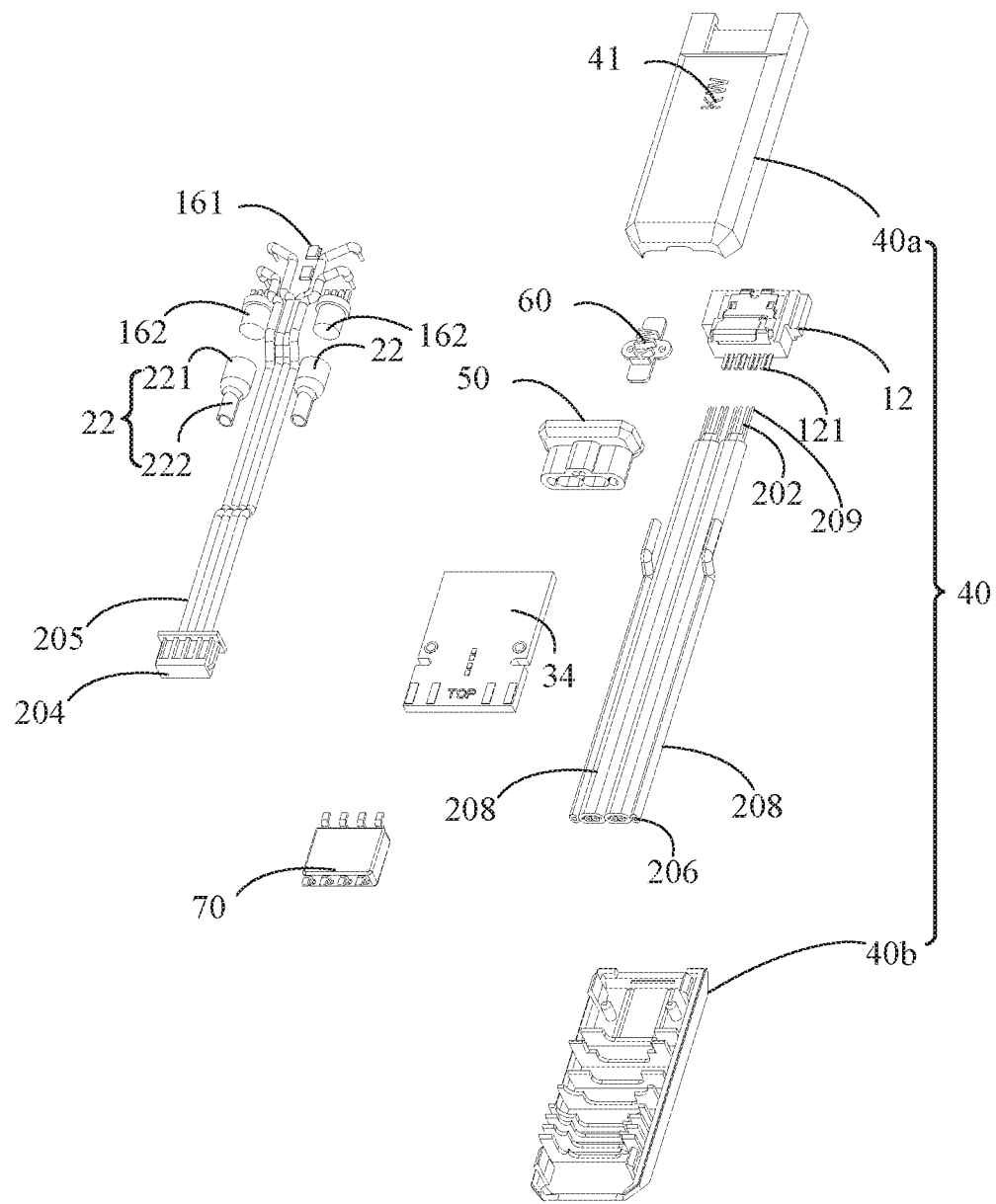
FIG. 1 illustrates an exploded perspective view of the preferred embodiment of a flexible illuminating flat cable structure of the present disclosure.

Please refer to FIG. 1. FIG. 1 is an exploded view of the flexible illuminating flat cable structure 10 in the preferred embodiment of the present disclosure. The flexible illuminating flat cable structure 10 includes a connector 12, a circuit board 34, a plurality of external signal lines 205, an external signal connector 204, an first illuminating unit 161, a second illuminating unit 162, a plurality of signal lines 202, a plurality of ground lines 209, a fiber cable 206, a transparent coat 208, a line protector 50, a light-guide unit 60, a controller 70, and an illuminating unit protector 22. The transparent coat 208 surrounds a plurality of signal lines 202, ground lines 209, and the fiber cable 206. The flexible illuminating flat cable structure 10 connects to the I/O port of an electronic device (not illustrated) via the connector 12. The shell 40 includes a first shell 40a and a second shell 40b. The first shell 40a and the second shell 40b unite into the shell 40. The first shell 40a includes an illuminating mark 41 which is, preferably, a hollow area. The illuminating mark 41 could be an icon, drawing, letter(s), word(s), or character(s) etc. The flexible illuminating flat cable structure 10 transmits a data signal or ground signal through the signal lines 202 or the ground lines 209. The electronic device transmits a power signal and a control signal to controller 70 through the external signal lines 205. The first illuminating unit 161 and the second illuminating unit 162 emit lights according to the power control signal generated by controller 70. Preferably, the first illuminating unit 161 and the second illuminating unit 162 are LEDs (Light-emitting Diodes). The lights emitted from first illuminating unit 161 will pass through the light-guide unit 60 and emit out via the illuminating mark 41. The lights emitted by second illuminating unit 162 will pass through and illumine the fiber cable 206. Users can get the splendid visual effect through the lighting illuminating mark 41 and fiber cable 206.

Figure 2:
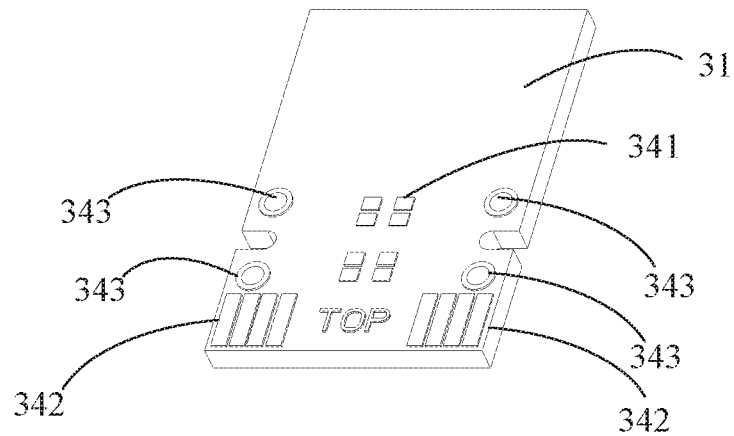
FIG. 2 and FIG. 3 are enlarged views of two opposite views from the circuit board respectively.
Figure 3:
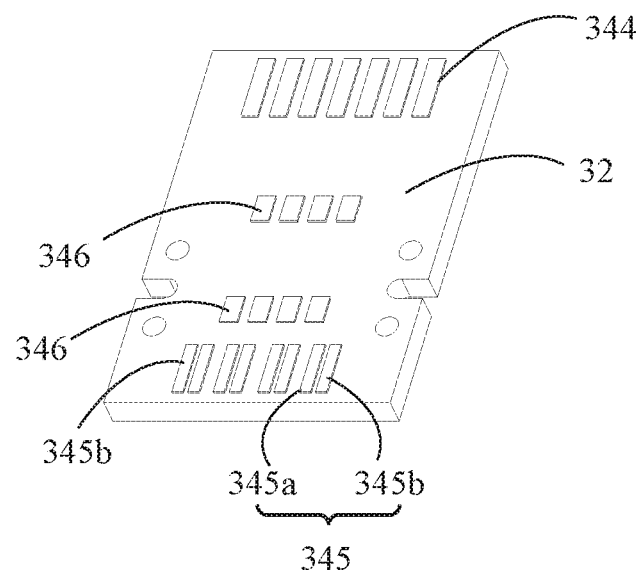

Please refer to FIG. 2 and FIG. 3. FIG. 2 and FIG. 3 are two opposite enlarged views of the circuit board 34 in FIG. 1. The circuit board 34 includes a first surface 31 and a second surface 32 which are opposite each other. On the first surface 31, the circuit board 34 includes a plurality of the first illuminating unit welds 341, a plurality of the second illuminating unit welds 342 and a plurality of external signal line welds 343. One the second surface 32, the circuit board 34 includes a plurality of contact welds 344, a plurality of signal line welds 345 and a plurality of controller welds 346. The illuminating unit welds 341 and the second illuminating unit welds 342 both couple to the corresponding controller welds 346. The external signal lines 205 couple to the external signal line welds 343 for conducting the power signal and the control signal. The first illuminating unit 161 connects to illuminating unit welds 341 for generating lights when receiving the power control signal. The plurality of contact welds 344 couple to the plurality of signal line welds 345 one-by-one. The contacts 121, the signal lines 202, and ground lines 209 contact the contact welds 344, the signal welds 345a, and 345b on the circuit board 34 respectively, so that the signals are able to be transmitted between the contacts 121, the signal lines 202 and ground line through the electrical connection between the contact welds 344 and signal welds 345a and 345b. The external signal connector 204 is disposed on the side of the external signal lines 205 opposite the circuit board 34 for receiving the power signal and control signal. The second illuminating unit 162 connects to the second illuminating unit welds 342 one the circuit board 34.

The signal lines 202 and ground lines 209 connect to a plurality of contacts 121 of the connector 12. The illuminating unit protector 22 unites the fiber cable 206 and the corresponding second illuminating unit 162. The illuminating unit protector 22 is made from plastic or metal. Each of the illuminating unit protector 22 includes a first hole 221 and a second hole 222. The first hole 221 sleeveably attaches the second illumination unit 162, and the second hole 222 sleeveably attaches the fiber cable 206. In this embodiment, the size of the first hole 221 is larger than that of the second hole 222. The size of the first hole fits to the size of the second illuminating unit 162, and the size of the second hole fits to the size of fiber cable 206.

Figure 4:
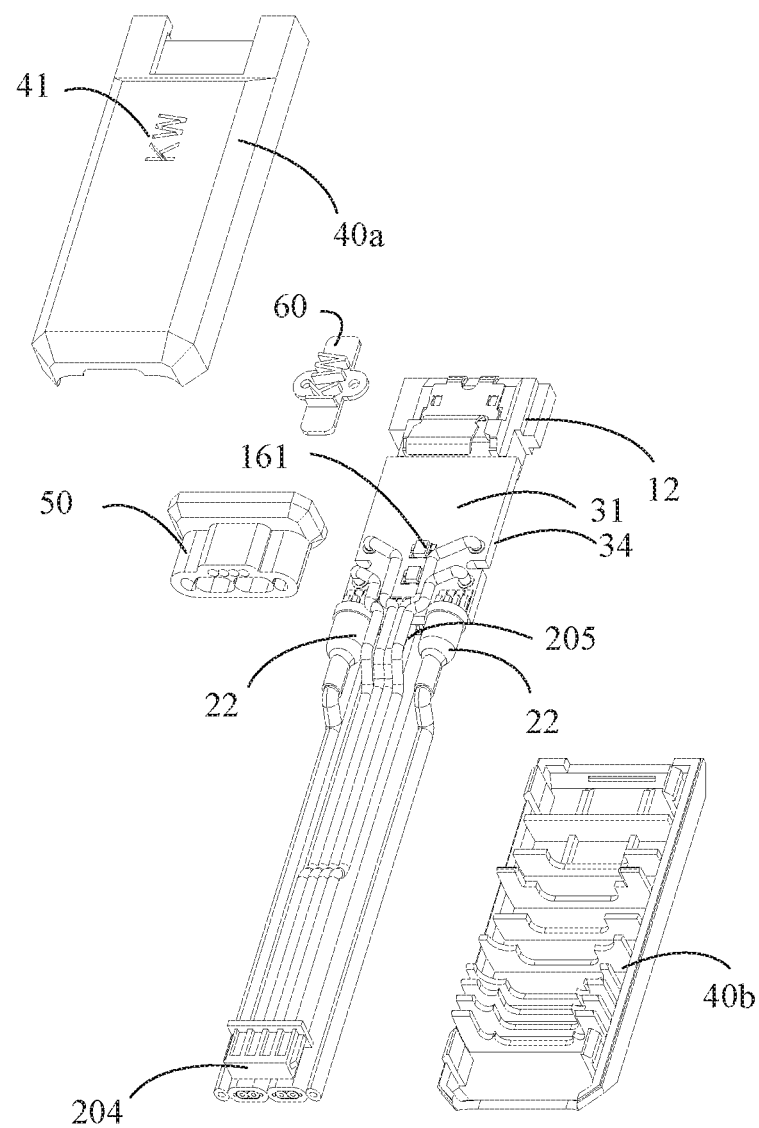
FIG. 4 and FIG. 5 are structure diagrams of two different views of the flexible illuminating flat cable structure after assembling the fiber cable, the illuminating unit protector, the second illuminating unit, the circuit board, and the controller.
Figure 5:
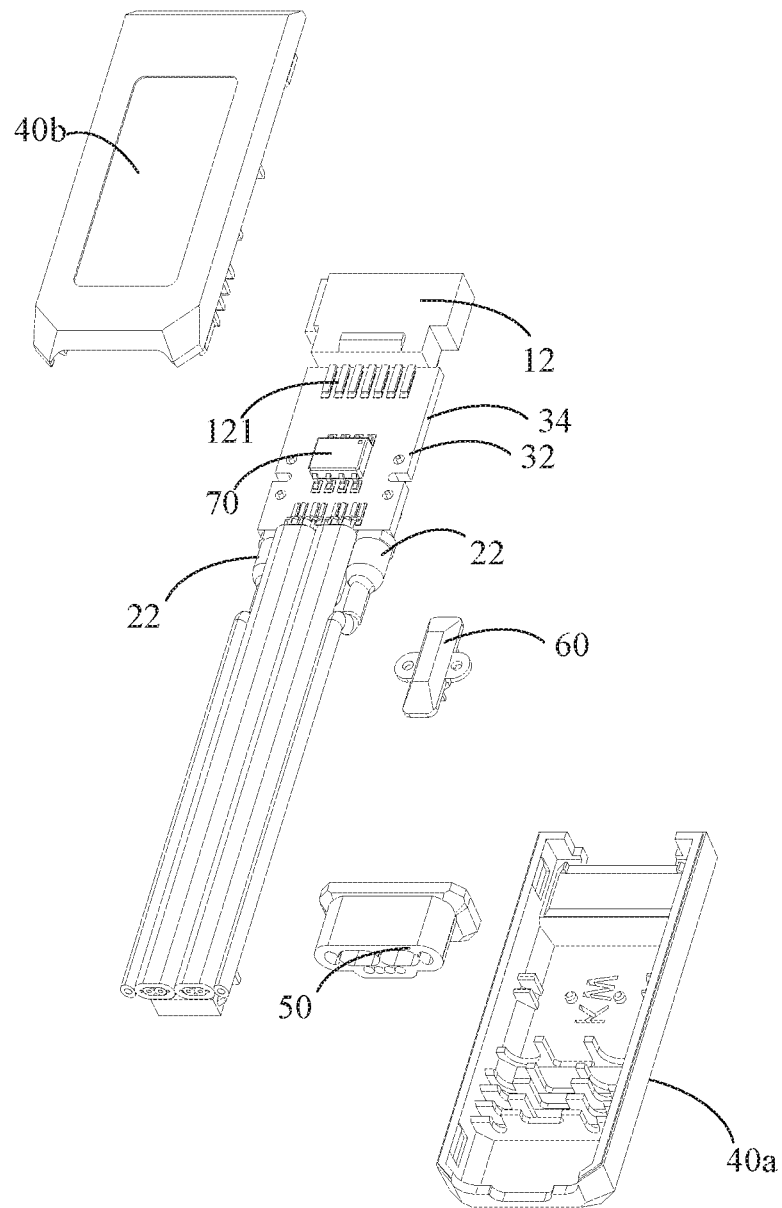

Please refer to FIG. 4 and FIG. 5. FIG. 4 and FIG. 5 illustrate the structure of the flexible illuminating flat cable structure 10 after combining the fiber cable 206, illuminating unit protector 22, second illuminating unit 162, circuit board 34, controller 70, and circuit board 34 in FIG. 1. Please note the viewing angles of FIG. 4 and FIG. 8 have a difference of 180 degrees (based on the direction perpendicular to the horizontal plane). The fiber cable 206 and the second illuminating unit 162 connect together through the illuminating unit protector 22 to allow the lights emitted by the second illuminating unit 162 to transmit via fiber cable 206. The external signal connector 204 is disposed on the side opposite the circuit board 34 of external signal lines 205 for receiving the power signal and the control signal. The second illuminating unit 162 connects to the second illuminating unit weld 342 of circuit board 34. The controller 70 connects to the plurality of controller welds 346 for outputting the power control signal to the first illuminating unit 161 and the second illumination unit 162 according to the adjust signal sent from the external signal lines 205. The first illuminating unit 161 and the second illumination unit 162 generate lights at the same time according to the power control signal when the power signal received by the external signal connector 204 and the control signal are sent to the circuit board 34 via the external signal lines 205. In addition, the first illuminating unit 161 and the second illuminating unit 162 also generate flashes in different frequencies or periods according to the power control signal. Preferably, the power control signal can control the color, illumination, the frequency of the flash, and the on-off period of the first illuminating unit 161 and the second illuminating unit 162.

Figure 6:
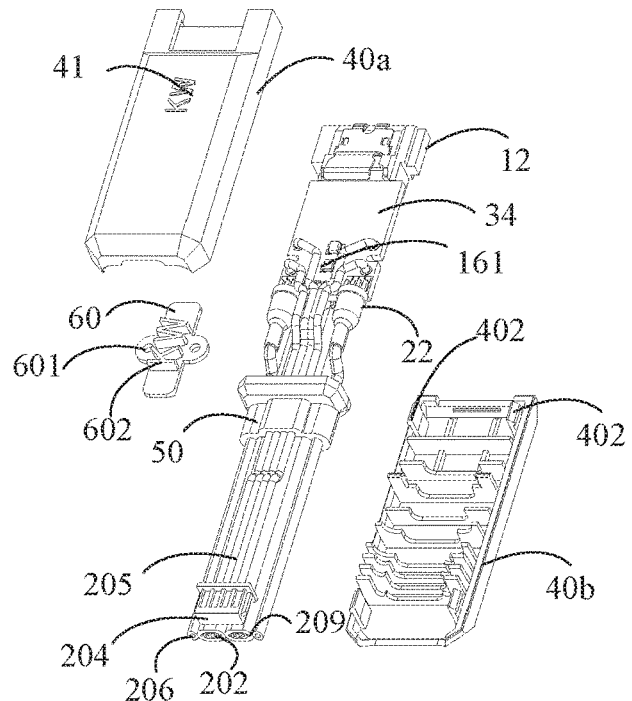
FIG. 6 is a structure diagram of the flexible illuminating flat cable structure after the fiber cable, the external signal line, the signal line, and the ground line in FIG. 4 pass through the line protector.
Figure 7:
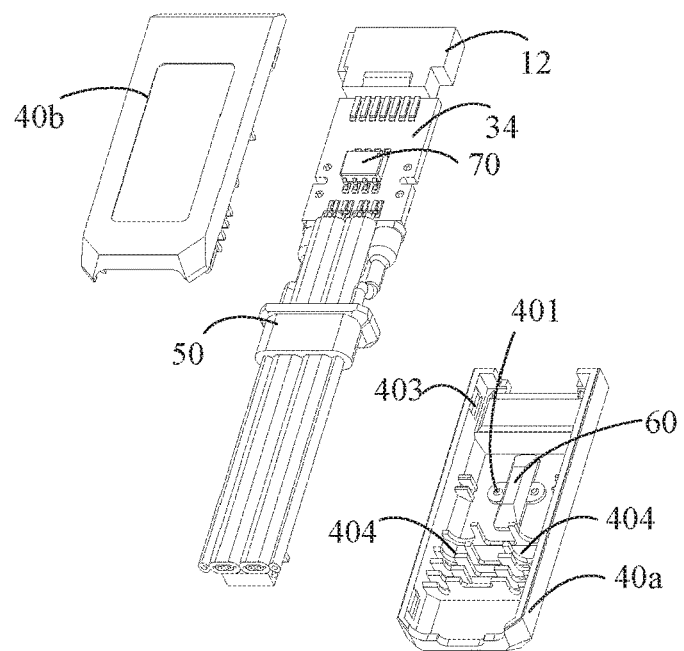
FIG. 7 is a structure diagram of the flexible illuminating flat cable structure after assembling the light-guide unit in FIG. 6 with the first shell.
Figure 10:
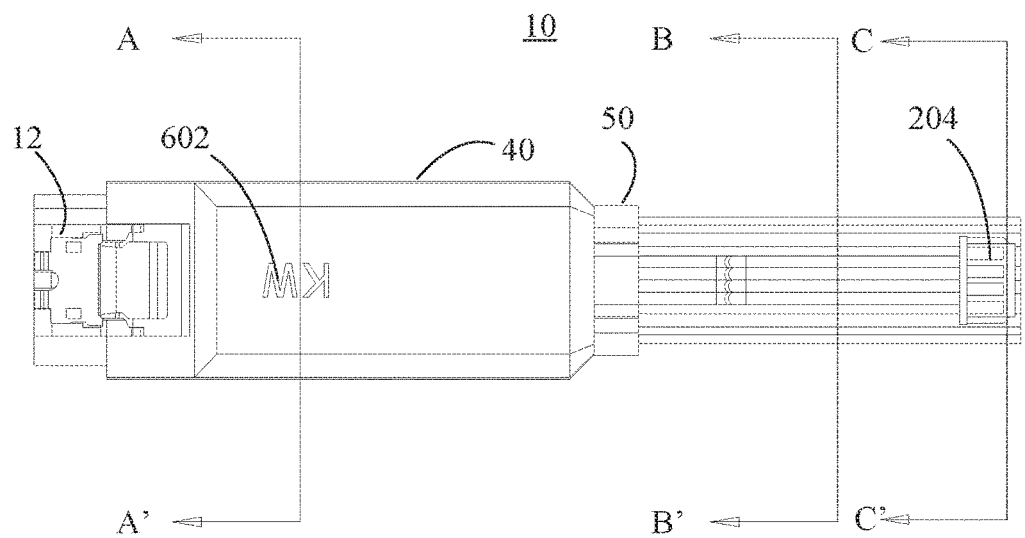
FIG. 10 is a top-view of the flexible illuminating flat cable structure of FIG. 9.

Please refer to FIG. 6 and FIG. 7. FIG. 6 is a structure diagram of the flexible illuminating flat cable structure 10 of FIG. 4 after sleeveably attaching the fiber cable 206, the external signal lines 205, the signal lines 202, and the ground line 209 into the line protector 50. FIG. 7 is a structure diagram of the flexible illuminating flat cable structure 10 of FIG. 6 after disposing the light-guide unit 60 on the first shell 40a. Please note the viewing angles of FIG. 6 and FIG. 7 have a difference of 180 degrees (based on the direction perpendicular to the horizontal plane). The line protector 50 can fix and protect the fiber cable 206, the external signal lines 205, the signal lines 202, and the ground lines 209 from direct exposure after passing through the fiber cable 206, the external signal lines 205, the signal lines 202 and the ground lines 209. The light-guide unit 60 is a transparent light-guide unit in clear, white, yellow, blue, red, green or other colors which could be made from glass or plastic probably smeared with phosphor. The light-guide unit 60 includes two guide holes 601 and light-guide appearance 602. Two of the guide holes 601 are aimed and inserted into the outstanding pillar 401 on the first shell 40a to make the light-guide unit 60 site on the inner side, facing the circuit board 34, of the first shell 40a. The light-guide unit 60 corresponds with the position of the first illuminating unit 161 and the light-guide appearance 602 could protrude over the first shell 40a through the hollow illuminating mark 41 (as shown in FIG. 10). Preferably, the outline of the light-guide appearance 602 matches with the illuminating mark 41. The upper shell 40a comprises one or more engaging recesses 404 to fix the fiber cable 206.

Figure 8:
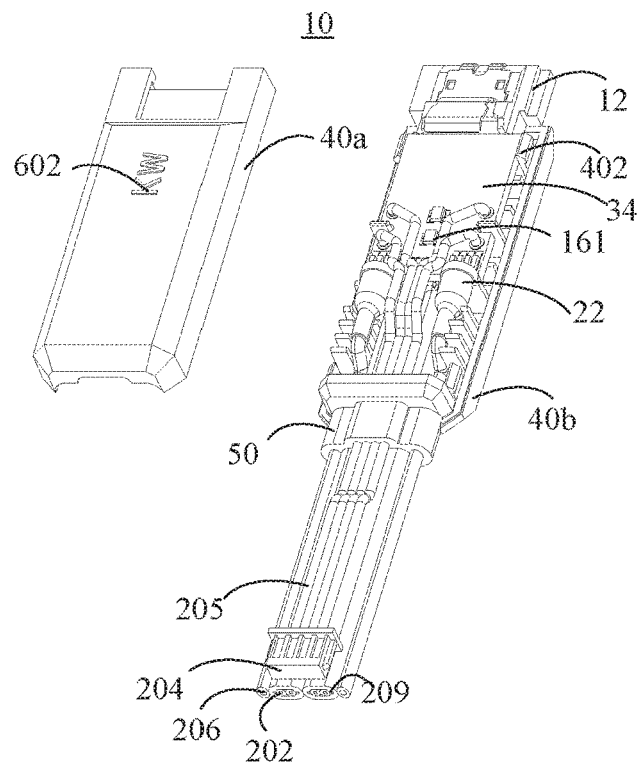
FIG. 8 is a structure diagram of the flexible illuminating flat cable structure after assembling the second shell in FIG. 7.
Figure 9:
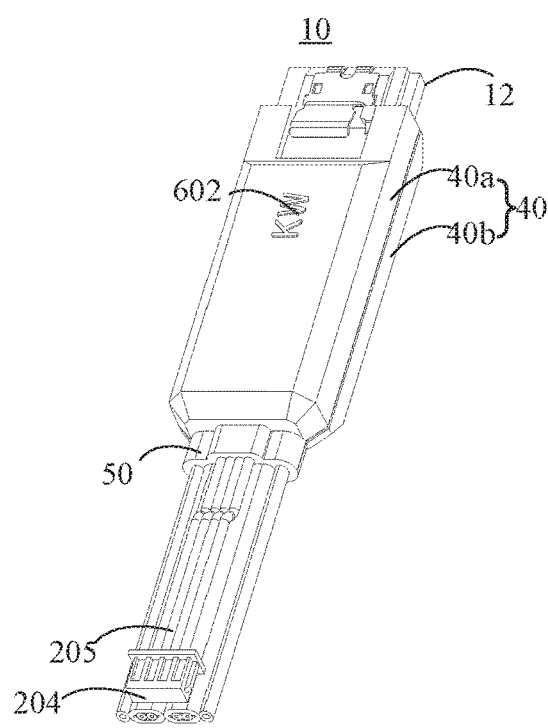
FIG. 9 is a structure diagram of the flexible illuminating flat cable structure after assembly is complete.

Please refer to FIG. 8 and FIG. 9. FIG. 8 is a structure diagram of the flexible illuminating flat cable structure 10 after assembling the second shell 40b of FIG. 7. FIG. 9 is a structure diagram of the flexible illuminating flat cable structure 10 when assembly is complete. The two hooks 402 of the second shell 40b are aimed and inserted into the two grooves 403 of the first shell 40a in order to assemble the first shell 40a and the second shell 40b into the shell 40. The shell 40 surrounds parts of the external signal lines 205, the controller 70, the illuminating unit protector 22, the first illuminating unit 161, and the circuit board 34. In addition, the line protector 50 matches the shell 40, as well.

Figure 11:
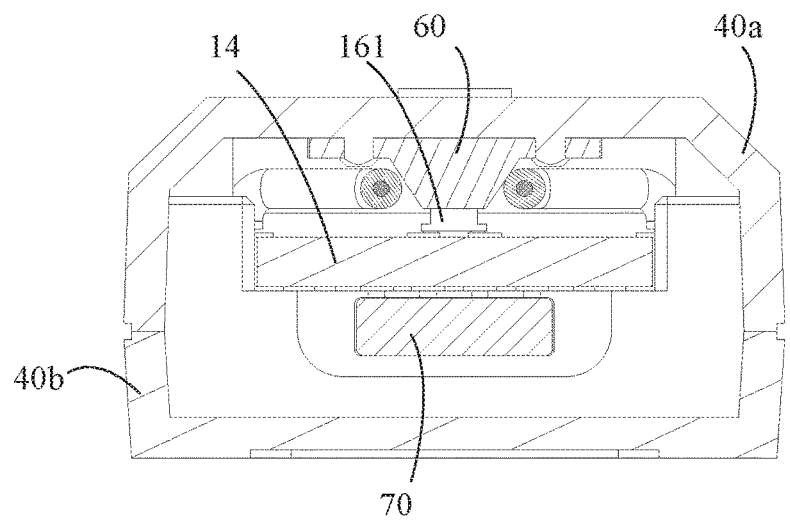
FIG. 11 is a cross-sectional view of FIG. 10 taken along a line A-A'.
Figure 12:
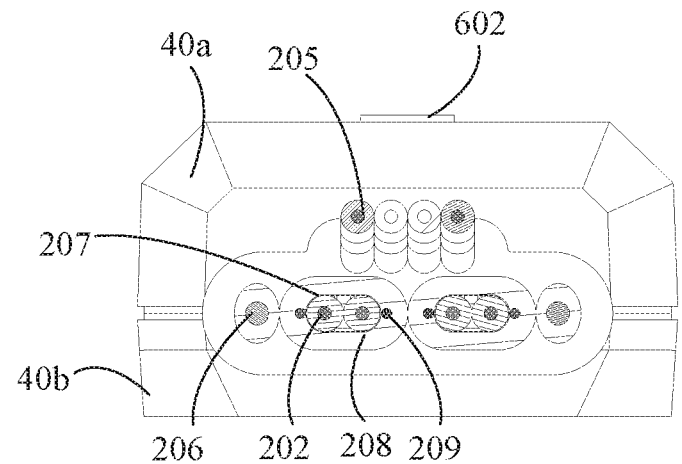
FIG. 12 is a cross-sectional view of FIG. 10 taken along a line B-B'.
Figure 13:
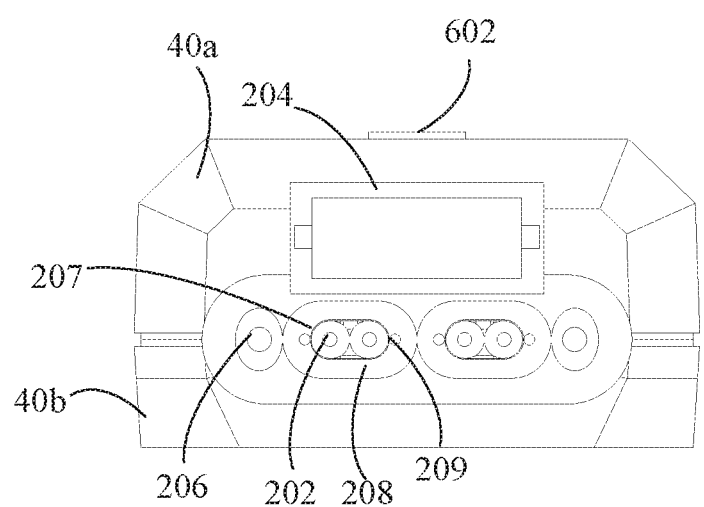
FIG. 13 is a cross-sectional view of FIG. 10 taken along a line C-C'.

Please refer to FIG. 10-13. FIG. 10 is a top view of the flexible illuminating flat cable structure 10 in FIG. 9. FIG. 11 is a cross-sectional view taken along a line A-A' in FIG. 10. FIG. 12 is a cross-sectional view taken along a line B-B' in FIG. 10. FIG. 13 is a cross-sectional view taken along a line C-C' in FIG. 10.

In the present embodiments, the plurality of signal lines 202 are surrounded by metal shield layer 207 to prevent interference from other nearby signal lines 202. Preferably, the ground lines 209 conduct the metal shield layer 207 to equal the electric potential for stabilizing the shield effect. The fiber cable 206, the ground lines 209, and the metal shield layer 207 are surrounded by the transparent coat 208, therefore, the lights transmitted by the fiber cable 206 becomes visible. The plurality of signal lines 202 connect to the plurality of contacts 121 of the circuit board 34 for transmitting the data signal sent by the electronic devices. The ground lines 209 transmit the ground potential sent by the electronic device. The external signal lines 205 conduct the power signal. The external signal connector 204 is disposed on the side opposite the circuit board 34 of external signal lines 205 for receiving the power signal and control signal while plugged into the input/output port of the electronic device. The external signal lines 205 pass the power signal and the control signal to the circuit board 34. The controller 70 generates a power control signal according to the power signal and the control signal. The first illuminating unit 161 and the second illuminating unit 162 emit lights according to the power control signal from the controller 70. The fiber cable 206 transmits the lights emitted from the first illuminating unit 161 and the second illuminating unit 162. The fiber cable 206 and the signal lines 202 are parallel to each other.

The flexible illuminating flat cable structure of the present disclosure requires not only signal transmission, but also the combination of the first illuminating unit and the second illuminating unit for allowing the lights emitted by the first illuminating unit to pass through the illuminating mark of the shell for the purpose of highlighting the drawing of the illuminating mark, and in the meantime allowing the flexible flat cable to be illuminated by passing the light emitted by the second illuminating unit through the fiber cable. In addition, the flexible illuminating flat cable of the present disclosure can make the lights flash from the flexible illuminating flat cable visible for users so that the customer's attraction to the products will be increased.

The present disclosure has been described with a preferred embodiment thereof and it is understood that many changes and modifications to the described embodiment can be carried out without departing from the scope and the spirit of the invention that is intended to be limited only by the appended claims.

What is claimed is:

1. A flexible illuminating flat cable structure comprising:
   a connector, comprising a plurality of contacts, and connected to an electronic device;
   a circuit board comprising a plurality of contact welds, a plurality of signal line welds, a first illuminating unit weld, and a plurality of external signal line welds, where the plurality of contact welds couple to the plurality of contacts and the plurality of signal line welds;
   a plurality of external signal lines, connected to the plurality of external signal line welds for conducting a power signal or a control signal;
   a first illuminating unit, connected to the first illuminating unit weld and generating lights according a power control signal;
   a shell, surrounding parts of the external signal lines, the first illuminating unit, and the circuit board, and comprising an illuminating mark corresponding to the first illuminating unit; and
   a plurality of signal lines, coupled to the plurality of signal line welds of the circuit board for transmitting data signals sent by the electronic device.

2. The flexible illuminating flat cable structure of claim 1, wherein the circuit board further comprises a second illuminating unit weld and the flexible illuminating flat cable structure further comprises:
   a fiber cable, which transmits lights; and
   a transparent coat, which surrounds the plurality of signal lines and the fiber cable; and
   a second illuminating unit, connected to the second illuminating unit weld for emitting lights into the fiber cable when receiving the power control signal.

3. The flexible illuminating flat cable structure of claim 2, wherein the first illuminating unit and the second illuminating unit control the color, illumination, flash frequency, and on-off period of the lights according to the power control signal.

4. The flexible illuminating flat cable structure of claim 2, wherein the shell comprises an engaging recess to fix the fiber cable.

5. The flexible illuminating flat cable structure of claim 1, wherein the flexible illuminating flat cable structure further comprises a light-guide unit disposed between the first illuminating unit and the shell for guiding the lights emitted from the first illuminating unit.

6. The flexible illuminating flat cable structure of claim 5, wherein the light-guide unit is a transparent unit in clear, white, yellow, blue, red, or green color.

7. The flexible illuminating flat cable structure of claim 2, wherein the flexible illuminating flat cable structure further comprises a line protector matching with the shell where the fiber cable, the plurality of signal lines, and the plurality of external signal lines pass through the line protector.

8. The flexible illuminating flat cable structure of claim 1, wherein the flexible illuminating flat cable structure further comprises an external signal line connector disposed on the side opposite the circuit board of the external signal lines, for receiving the power signal or the control signal.

9. The flexible illuminating flat cable structure of claim 1, wherein the illuminating mark is a hollow area.

10. A flexible illuminating flat cable structure comprising:
    a connector, comprising a plurality of contacts, and connected to an electronic device;
    a circuit board, comprising a plurality of contact welds, a plurality of signal line welds, a second illuminating unit weld, and a plurality of external signal line welds, where the plurality of contact welds couple to the plurality of contacts and the plurality of signal line welds;
    a plurality of external signal lines, connected to the plurality of external signal line welds for conducting a power signal or a control signal;
    a plurality of signal lines, coupled to the plurality of signal line welds of the circuit board for transmitting the data signal sent by the electronic device;
    a fiber cable, transmitting lights;
    a transparent coat, surrounding the plurality of signal lines and the fiber cable; and
    a second illuminating unit, connected to the second illuminating unit weld for emitting lights into the fiber cable according to a power control signal.

11. The flexible illuminating flat cable structure of claim 10, wherein the circuit board further comprises a first illuminating unit weld and the flexible illuminating flat cable structure further comprises:
    a first illuminating unit, connected to the first illuminating unit weld for emitting lights to the fiber cable when receiving the power control signal; and
    a shell, which surrounds parts of the external signal lines, the first illuminating unit, and the circuit board, and comprises an illuminating mark corresponding to the first illuminating unit.

12. The flexible illuminating flat cable structure of claim 11, wherein the first illuminating unit and the second illuminating unit control the color, illumination, flash frequency, and on-off period of the lights according to the power control signal.

13. The flexible illuminating flat cable structure of claim 11, wherein the shell comprises an engaging recess to fix the fiber cable.

14. The flexible illuminating flat cable structure of claim 11, wherein the flexible illuminating flat cable structure further comprises a light-guide unit disposed between the first illuminating unit and the shell for guiding the lights emitted from the first illuminating unit.

15. The flexible illuminating flat cable structure of claim 11, wherein the light-guide unit is a transparent unit in clear, white, yellow, blue, red, or green color.

16. The flexible illuminating flat cable structure of claim 11, wherein the flexible illuminating flat cable structure further comprises a line protector matching with the shell where the fiber cable, the plurality of signal lines, and the plurality of external signal lines pass through the line protector.

17. The flexible illuminating flat cable structure of claim 10, wherein the flexible illuminating flat cable structure further comprises an external signal line connector disposed on the side opposite the circuit board of the external signal lines, for receiving the power signal and the control signal.

18. The flexible illuminating flat cable structure of claim 11, wherein the illuminating mark is a hollow area.

* * * * *